United States Patent
Kahn et al.

[11] Patent Number: 5,789,054
[45] Date of Patent: Aug. 4, 1998

[54] SPIN-TRANSITION PARENT COMPOUNDS AND DEVICES HAVING MEANS FOR WRITING, STORING AND ERASING, WHICH COMPRISE AN ACTIVE MEDIUM INCLUDING AT LEAST ONE OF SAID COMPOUNDS

[75] Inventors: Olivier Kahn, Leognan; Charlotte Jay, Paris; Epiphane Codjovi, Breuillet, all of France

[73] Assignee: U.S. Philips Corporation, New York, N.Y.

[21] Appl. No.: 656,153

[22] Filed: May 31, 1996

[30] Foreign Application Priority Data

May 31, 1995 [FR] France .................. 95 06477

[51] Int. Cl.⁶ .................................. B32B 3/00
[52] U.S. Cl. .................. 428/64.1; 428/64.2; 428/64.4; 428/913; 430/270.14; 430/495.1; 430/945; 548/262.2; 548/267.2; 548/269.2
[58] Field of Search .................... 428/64.1, 64.2, 428/64.3, 64.4, 913; 430/270.14, 495.1, 945; 548/255, 262.2, 267.2, 269.2

[56] References Cited

U.S. PATENT DOCUMENTS 5,418,076 5/1995 Shiratori ............... 428/694 EC
5,582,900 12/1996 Khan et al. ............... 428/195

FOREIGN PATENT DOCUMENTS 0543465 5/1993 France .

*Primary Examiner*—Elizabeth Evans
*Attorney, Agent, or Firm*—Ernestine C. Bartlett

[57] ABSTRACT

The invention relates to a spin-transition parent compound in powdered form, comprising a network having molecules which are each formed from a complex in which a metallic ion M having an electronic configuration in d5 or in d6 or in d7, is bonded to at least one aminotriazole ligand of the formula [L$_2$N-trz], wherein L is an alkyl radical (C$_n$H$_{2n+1}$) and n is an integer which is equal to or greater than zero, each molecule also including a sulforganic anion comprising a sulfito radical (SO$_3^-$), and the network also including at least one water molecule (H$_2$O) per molecule of the metallic complex M, said water molecule(s) in the network only being bonded to the aminotriazole ligand by a hydrogen bond.

In this compound, the anion may be, for example, a sulfito-aryl having a benzene radical or a sulfito-aryl derived from a benzene radical, or a sulfito-aryl having a saturated or unsaturated organic chain, an alkyl sulfito-halide or an aryl sulfito-halide.

27 Claims, 2 Drawing Sheets

5,789,054

SPIN-TRANSITION PARENT COMPOUNDS AND DEVICES HAVING MEANS FOR WRITING, STORING AND ERASING, WHICH COMPRISE AN ACTIVE MEDIUM INCLUDING AT LEAST ONE OF SAID COMPOUNDS

FIELD OF THE INVENTION

The invention relates to spin-transition parent compounds and to methods of manufacturing said compounds.

The invention also relates to devices having means for writing, storing and erasing, which comprise an active medium including at least one of said parent compounds. The invention further relates to methods of utilizing these devices.

The invention is used in the field of information storage and processing devices and/or data display devices.

BACKGROUND OF THE INVENTION

In Patent Application EP-0 543 465, there is already disclosed a family of compounds which can suitably be used to form materials which can be written and erased by thermal action.

This family is formed from a network of molecules, comprising:

A) a metal, such as iron $Fe_{II}$ or $Fe_{III}$, or cobalt $Co_{II}$.

B) ligands which are bonded to this metal, such as:

a substituted 1-2-4 triazole of the abridged formula R-Trz, wherein R is an alkyl $C_nH_{2n+1}$

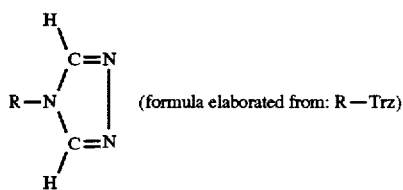

(formula elaborated from: R—Trz)

a 1-2-4 triazolate of the abridged formula $Trz^-$

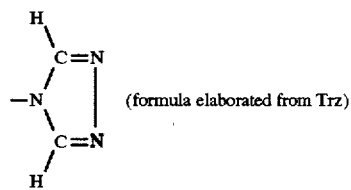

(formula elaborated from Trz)

C) an anion which is selected from the group formed by $BF_4^-$, $ClO_4^-$, $Co_3^{2-}$, $Br^-$, $Cl^-$ D) and at least one water molecule $H_2O$ which is not covalently bonded to the metal complex, but whose presence in the network can be attributed to an hygroscopic agent selected from the precursors of the metal nucleus, E) and a doping agent, which is an aminotriazole of the abridged formula R'-Trz, wherein R' is an amine group $N-(C_nH_{2n+1})_2$

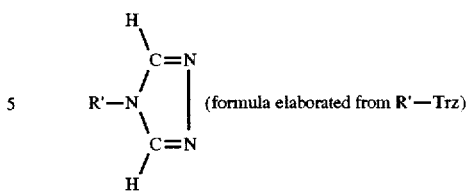

(formula elaborated from R'—Trz)

The general formula of the molecules of the family described in the above-mentioned document can be expressed as follows:

$$M^{II}[(R\text{-}Trz)_2(Trz^-)]_{1-x}(R'\text{-}Trz)_xA, n\ H_2O.$$

In this formula, M is the metal and A is the anion, $$TrzR-TrzR'-Trz$$

are ligands of the triazolate and substituted triazole types, the respective proportions of which are governed by the value x of the concentration, and n is integer, not zero, which indicates the number of water molecules $H_2O$ which are bonded in a non-covalent manner to the molecule of the metal complex.

In addition, in this formula the concentration value x is small, so that the proportion of the ligand R'-Trz is small and constitutes only a doping agent which acts on the intrinsical properties of the material.

A method of preparing compounds of this general family consists in combining a salt of the metal (for example $Fe(ClO_4^-)_2$) with the ligands in an acid solution, thereby forming a precipitate. Subsequently, the precipitate is separated from the solution. Said precipitate is obtained in powdered form. By using an excess of the metal salt, a certain quantity of water is captured.

The compounds of the general family described in EP-0 543 465 exhibit a transition of spin states, between a low-spin state (LS) and a high-spin state (HS), which is induced only by thermal action, and which involves electronic and structural changes of the molecules. Said changes bring about an abrupt change of the absorption spectrum of the molecules and hence of the color of the compounds, and the electronic energy levels also undergo a change.

In the low-spin state (LS), the compounds are dark purple, whereas in the high-spin state (HS) these compounds are chalk-white. In addition, each of the high-spin (HS) and low-spin (LS) states is perfectly stable.

The spin transition of known compounds presupposes the existence of two potential wells, one of which corresponds to the low-spin state (LS) and the other corresponds to the high-spin state (HS). These potential wells are separated by a potential barrier. The bottom of each of the potential wells correspond, respectively, to a first and a second energy level, the energy level of the bottom of the high-spin well being higher than the energy level of the bottom of the low-spin well.

The application of a thermal perturbation to one of the compounds of said family, which has first been brought to a stable low-spin state (LS), in which the electrons are trapped in the first potential well, results in the induction of unstable, excited high-spin states, whereafter the electrons relax via allowed transitions, while following a principal relaxation path, being the path of the second potential well, which corresponds to a perfectly stable high-spin state in a specific temperature range. The electrons remain trapped in the second potential well corresponding to the high-spin state (HS) and do not spontaneously return to the first potential well corresponding to the low-spin state (LS). To return to the low-spin state (LS), it is necessary to cool the compound to a temperature which lies below the temperature of transition from the high-spin state to the low-spin state takes place.

Consequently, during transitions of the spin state, these materials exhibit a retardation effect which can be attributed to intermolecular cooperativity, resulting in a hysteresis phenomenon.

When a thermal perturbation is applied, the cooperative effect brings about that either:

substantially all molecules simultaneously undergo a transition within an aggregate (or network), or substantially none of the molecules undergoes said transition.

Consequently, these compounds exhibit the phenomenon of bistability in a range between a first temperature of transition from the high-spin state to the low-spin state and a second temperature of transition from the low-spin state to the high-spin state, which corresponds to the phenomenon of hysteresis; and this range of bistability lies around the critical temperature Tc of the hysteresis cycle.

The compounds of the general family disclosed in EP 0 543 465 can also be used as memory materials which can be thermally written and erased, optically read and, thus, also be used to store information, process information or display information.

The above-mentioned document discloses that the temperature range in which the compounds operate depends to a substantial extent on the properties of the ligand selected as the dopant.

Application on an industrial scale as materials for recording or storing information, requires the compounds of the family disclosed in the above-mentioned document to be suitable for use in the ambient-temperature range. To this end, the compounds should exhibit an amplitude of the hysteresis cycle of several tens of degrees, the critical temperature Tc being around ambient temperature, i.e. Tc≈293K (+20°).

The above-mentioned document describes a series of exemplary compounds 1 to 4 in Table 1, among which:

compound No. 3 having the formula:

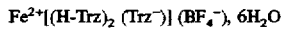

$Fe^{2+}[(H-Trz)_2 (Trz^-)] (BF_4^-), 6H_2O$ whose hysteresis amplitude is average, i.e. ΔT=40 K, but whose critical temperature is much too high $T_c \approx +343$ (+70° C.), compound No. 1 having the formula

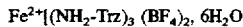

$Fe^{2+}[(NH_2-Trz)_3 (BF_4)_2, 6H_2O$ whose hysteresis amplitude is too small, ΔT=10 K, and also the critical temperature is too low, $T_c=+253$ K (-20° C.).

According to the above-mentioned document, the critical temperature of a specific compound can be influenced by adding another compound of said family to said compound as a doping agent.

For example, doping of compound No. 3 by means of compound No. 1 is recommended, resulting in compound No. 5 of Table II in the above-mentioned document; said compound No. 5 has the following formula:

$Fe''[(HTrz)_2(Trz^-)]_{0.9} (NH_2-Trz)_{0.1}(BF_4^-), 6H_2O$, wherein Trz- is 1-2-4 triazolate and H-Trz is 1-2-4triazole are used as ligands, $NH_2$-Trz is aminotriazole and is used as a dopant, said compound having a suitable critical temperature Tc≈293 to 298 K (20° to 25° C.) but the hysteresis amplitude that is much too small, ΔT=10 to 20 K.

The above-mentioned document provides means for influencing the critical temperature in such a manner that it is brought close to the ambient temperature, but it does not provide means which enable, at the same time, a great and suitable value of the hysteresis amplitude to be maintained or attained.

The above-mentioned document does not provide a single accurate means for directly obtaining a compound having a great hysteresis amplitude around ambient temperature, i.e. a range of bistability which is absolutely suitable for the intended industrial application.

SUMMARY OF THE INVENTION

It is an object of the invention to provide compounds which are selected among those which:

present thermally induced spin transitions and hence can be thermally written and erased, can be read optically, exhibit stable spin states, have a critical temperature in the ambient temperature range, have a bistability range with a much larger amplitude than that of the compounds proposed by the above-mentioned document EP 0 543 465, so that a better control of both the writing and erasing operations is possible and, in particular, the temperatures at which writing or erasing take place meet the standards imposed by the manufacturers of display devices, said standards being:

T≤278 K (5° C.) for erasing

T>333 K (50° C.) for writing.

These objects are achieved by means of a spin-transition parent compound in powdered form, comprising a network having molecules which are each formed from a complex in which a metallic ion M having an electronic configuration in d5 or in d6 or in d7, is bonded to at least one aminotriazole ligand of the formula:

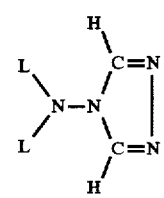

wherein L is hydrogen or an alkyl radical $(C_nH_{2n+1})$ and n is an integer which is equal to or greater than one, each molecule also including a sulforganic anion comprising a sulfito radical $(SO_3^-)$, such as:

a sulfito aryl in which the sulfito radical is bonded to a benzene radical or its derivatives, a sulfito alkyl in which the sulfito radical is bonded to a saturated or unsatured organic chain, an alkyl sulfito halide, an aryl sulfito halide, and the network also including at least one water molecule per molecule of the metallic complex, said water molecule (s) in the network only being bonded to the aminotriazole ligand by a hydrogen bond.

This parent compound exhibits an effect which is not described in European Patent Application EP 0 543 465. This effect consists in that the parent compound in accordance with the invention exhibits:

a large bistability amplitude which corresponds to a hysteresis having an amplitude $\Delta T \geq 70°$ K., a bistability range whose center coincides with the ambient temperature, corresponding to a critical temperature $Tc \approx 290$ to $300$ K ($17°$ C. to $27°$ C.).

The novel type of anion of the molecules in the networks of the parent compounds, defined as sulforganic anion, exerts an influence on the strength of the hydrogen bonds between the aminotriazole ligands and the water molecules ($H_2O$) of the network. A proper control of the strength of the hydrogen bonds enables a better control of the cooperativity between the molecules in the network to be achieved.

As mentioned hereinabove, spin transitions are caused by the cooperativity between the molecules in the network, which cooperativity ensures that either substantially all molecules are jointly subject to transition or substantially no molecules are subject to transition.

In the compounds described in the above-mentioned prior-art document, the intermolecular bonds could be ascribed solely to hydrogen bonds between the 1-2-4 triazole ligands and the water molecules. The bonds were uncontrollable.

In the compounds in accordance with the invention, the hydrogen bonds between the aminotriazole ligands and the water molecules are strengthened and controlled, in a surprising manner, by the presence of sulforganic anions. By virtue thereof, during spin transitions, a larger number of molecules jointly undergo transition in a shorter period of time.

The use of aminotriazoles as ligands in the molecules, enables the critical temperature Tc of the bistability range of the parent compounds to be controlled; and the use of sulforganic compounds as anions in the molecules enables also the strength of the hydrogen bonds between said aminotriazole ligands and the water molecules to be controlled, consequently, the temperature amplitude $\Delta T$ corresponding to the bistability range around said critical temperature Tc is also controlled.

A critical temperature Tc which is substantially equal to the ambient temperature in combination with a temperature amplitude $\Delta T$ of 70 K, which corresponds to the bistability range of the compounds, was hitherto impossible.

These novel properties enable this parent compound to be used more satisfactorily in the preparation of active media for information display devices, information erasing devices and information processing devices.

The spin-transition parent compounds in accordance with the invention are in powdered form. These powdered compounds are associated with binders or used to form layers which are deposited on a support, so as to form an active medium for a device for recording, storing and/or displaying information.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

I—Chemical formulation of the selected parent compounds in accordance with the invention.

In accordance with the invention, a description is given of a sub-family of compounds selected from the general family of spin-transition compounds. The terms "spin-transition compounds" and "spin-transition parent compounds" are used interchangeably to denote the products selected in accordance with the invention in this general formula.

Like the known compounds of the general family, the compounds of the selected sub-family exhibit spin-transition properties which can only be induced by thermal action, both for the low-spin state (LS) and for the high-spin state (HS). These transitions are associated with a hysteresis phenomenon between the low-spin state (LS) and the high-spin state (HS).

The compounds of the sub-family, which will be described hereinbelow, exhibit, for the first time, properties which are indispensable for the manufacture on an industrial scale of devices for displaying and processing information.

These compounds simultaneously exhibit a critical temperature Tc which is equal to the ambient temperature and a hysteresis amplitude $\Delta T$ which is equal to or larger than 70 K.

However, in order to obtain these properties, the selected compounds must be prepared in accordance with a suitable method of manufacture.

Ia) General formulation

The sub-family of the spin-transition compounds selected in accordance with the invention comprises chemical parent compounds in powdered form, which are formed from a network including molecules which are each composed of a metal-ligand complex and anions, and including at least one water molecule per molecule of the metal-ligand complex.

Ib) The metal of the metal-ligand complex

Figure 1:
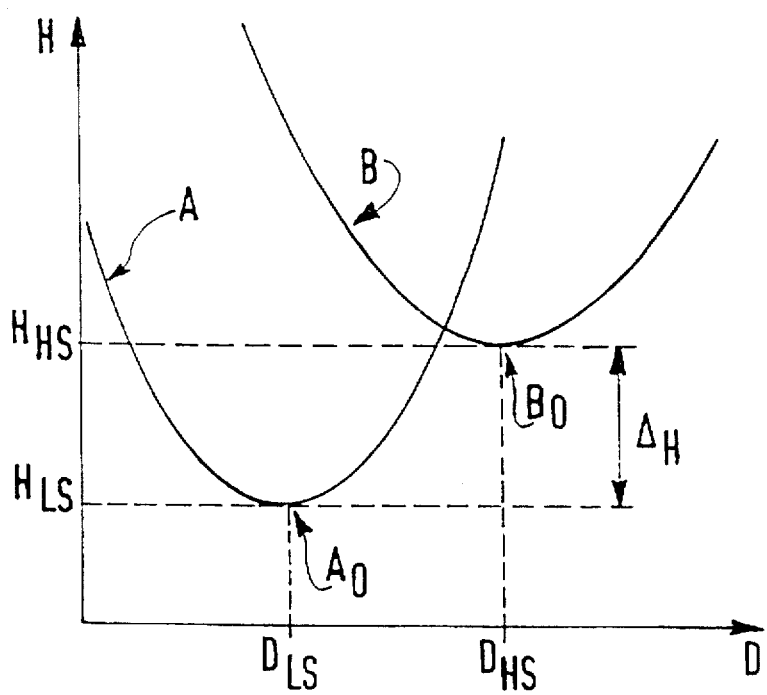
FIG. 1 shows the enthalpy H, which corresponds to the spin transition of one mole of the compound, as a function of arbitrary molecular coordinates, for example the metal-ligand distance D.

FIG. 1 shows, as a function of arbitrary atomic coordinates, which may be, for example, the metal-ligand distance D, the enthalpy variation $\Delta H$ which is associated with the Gibbs equation:

$$\Delta G = G_{HS} - G_{LS} = \Delta H - T \Delta S,$$

wherein $\Delta H$ is the enthalpy change,

T is the temperature, $\Delta S$ is the entropy change.

$\Delta G$ is the difference between the Gibbs free energy levels associated with the HS and LS states.

The spin transition of the materials in accordance with the invention presupposes the existence of two potential wells, one corresponding to the low-spin state (LS) and the other corresponding to the high-spin state (HS). These potential wells are separated by a potential barrier. The bottom of each of the potential wells corresponds, respectively, to an energy level $H_{LS}$ and $H_{HS}$. The energy which relates to the potential barrier is referred to as $H_B$.

The energy difference between the bottoms of the two potential wells is the change $\Delta H$ which is associated with the Gibbs energy given above.

The application of a thermal perturbation to one of the selected compounds, which has first been brought to a stable low-spin state (LS) in which the electrons are trapped in the first potential well, results in the induction of unstable, excited high-spin states, after which the electrons relax via allowed transitions, while following a principal relaxation path, i.e., the path of the second potential well, which corresponds to a perfectly stable high-spin state (HS). The electrons remain trapped in the second potential well corresponding to HS and do not spontaneously return to the first potential well corresponding to LS. To return to the LS state, the compound must be cooled to a temperature which corresponds to the low-spin state (LS). Consequently, a hysteresis phenomenon is associated with the spin-transition properties.

Figure 2:
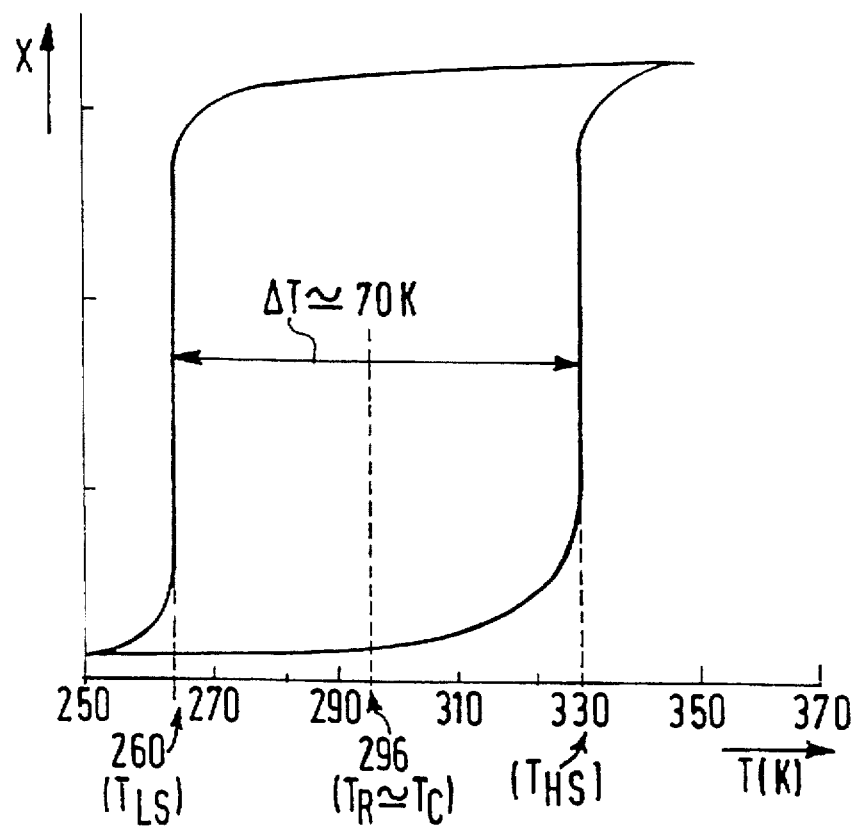
FIG. 2 shows the hysteresis cycle of an exemplary compound, referred to as compound AA)

FIG. 2 shows such a hysteresis cycle. The molar fraction MF of a material which has undergone a transition at a temperature T is plotted on the y axis and the temperature T is plotted on the X-axis.

The stability of each one of the LS and HS states is fixed by the difference in the Gibbs free energy ΔG which corresponds to the spin transition of a specific quantity of the material, for example 1 mole. Thus, it is very important to take into account the relative values of the terms ΔH and TΔS.

As mentioned hereinabove, the thermodynamic conditions have been selected in such a way that the selected, exemplary compounds exhibit two stable states at ambient temperature. At said temperature, the entropy term TΔS of the Gibbs formula may become non-negligible under certain thermodynamic conditions. In connection with the Gibbs formula and FIG. 1, it should be noted that the probability that spin-transition related phenomena occur is greater as the value of the term ΔG is greater and as the negative value of said term is greater.

Consequently, the entropy term TΔS plays an important role in the phenomenon used to carry out the invention. It implies a participation of a spin-degeneration term of the metal ion of the molecule, and a participation of a network term.

The spin-degeneration term refers to the degeneration of the atomic states of the metal ion of the molecule. Said degeneration term depends on the electronic configuration of the metal ion selected, and can be expressed by the formula $$2s+1$$

wherein s is the spin value. The degeneration term may vary from 1 to 5.

Hereinafter, $s_{HS}$ denotes the spin value for the high-spin state and $s_{LS}$ denotes the spin value for the low-spin state.

The entropy change ΔS is given by the equation:

$$\Delta =$$

wherein the term $Rl_n$ is a constant which is governed by the constant R of perfect gases.

It is noted that:

the greater the difference between the $S_{HS}$ and $S_{LS}$ states, the greater the detectability of the magnetic effect associated with the spin transition is. This has a favorable effect on the intended application in accordance with the invention.

the smaller the difference between said spin values, the smaller the entropy change ΔS is. Due to the fact that the term ΔS forms part of the Gibbs equation in the form of −TΔS (minus T multiplied by ΔS), the smaller the entropy change, the higher the critical temperature of the spin-transition phenomenon is, which has a favorable effect on the intended application in accordance with the invention. The critical temperature Tc should at least be equal to the ambient temperature, which is difficult to achieve because the majority of the spin-transition materials, which have been known for a number of years, have critical temperatures well below 273 K.

Consequently, there are two favorable, yet contradictory, situations which are difficult to combine. For this reason, a selection of metal ions is proposed which enable a compromise between said two situations to be reached, because said ions simultaneously exhibit:

a difference between the $S_{HS}$ and $S_{LS}$ states which is large enough to obtain magnetic effects which can be detected in a suitable manner, and a difference in value which is not too great, so that the resultant entropy change ΔS has a suitable value which leads to a critical temperature Tc which lies exactly in the ambient-temperature range from 270 to 300 K.

As a result, the metal ions selected to form the molecules of the network are those which exhibit an electronic configuration in d4 such as $Cr^{2+}$, $Mn^{3+}$; in d5 such as $Mn^{2+}$, $Fe^{3+}$; in d6 such as $Fe^{2+}$, $Co^{3+}$; in d7 such as $Co^{2+}$, $Ni^{3+}$, etc. as indicated, for example, in the periodic system, i.e., the Mendeleev Periodic Table known to those skilled in the art.

All metal ions having such an electronic configuration could be used to form the metal-ligand complex.

Preferably, use is made of:

$Fe^{2+}$, which has an electronic configuration in d6 and which exhibits two spin states between a spin value:

$S_{LS}=0$, $Fe^{2+}$ being diamagnetic for the low-spin state, and $S_{HS}=2$, $Fe^{2+}$ being paramagnetic for the high-spin state, $Co^{2+}$, which has an electronic configuration in d7, and which exhibits one spin value:

$S_{LS}=½$ for the low-spin state, $S_{HS}=3/2$ for the high-spin state, $Co^{3+}$, which has an electronic configuration in d6, and which exhibits one spin value:

$S_{LS}=0$ for the low-spin state, $S_{HS}=2$ for the high-spin state, $Ni^{3+}$, which has an electronic configuration in d7, and which exhibits one spin value:

$S_{LS}=½$ for the low-spin state, and $S_{HS}=3/2$ for the high-spin state.

Consequently, it is important to select metal ions having the greatest transition between the two spin states, that is the greatest difference between $S_{LS}$ and $S_{HS}$, to obtain magnetic effects which are sufficiently detectable.

$Fe^{3+}$ is a special case. This metal ion exhibits an electronic configuration in d5 and, consequently, forms part of the category of suitable ions. Its spin states vary between $S_{LS}=½$ and $S_{HS}=5/2$, which spread is large enough. However, this ion is naturally red, so that its absorption band coincides with the absorption band of the starting compound during the spin-transition process. Consequently, a significant and useful color change of said starting compound during the spin transition cannot take place.

Ic) Ligands of the metal-ligand complex

As described hereinabove, it is necessary to reach a compromise between a degeneration term whose value is sufficiently large to imply a discernible spin effect, yet not too large, so that it can remain in an ambient temperature range which is suitable only for industrial applications.

It has also been shown hereinabove that ordering the structure by the formation of bond bridges between metal nuclei (short-distance order) causes the entropy term ΔS to decrease, as a result of which the thermal state has less influence on the spin transitions and the stability of the low-spin state LS at elevated temperatures (i.e. near ambient temperature in comparison with absolute zero) is enhanced. To form said bond bridges between metal nuclei, the metal ion of the metal-ligand complex must be bonded to at least a ligand of the 1-2-4 aminotriazole type, which is a substituted 1-2-4 triazole comprising an amine radical.

The general formula of substituted 1-2-4 triazoles is:

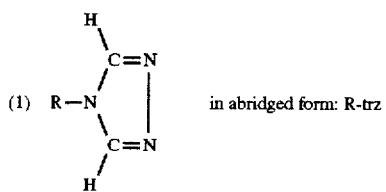

In the formula of said subsituted 1-2-4 triazoles

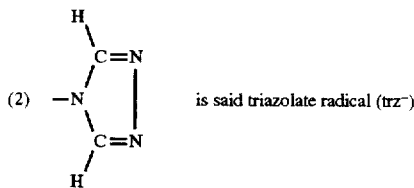

and R is another radical, which must be an amine to form the desired amino-triazole ligand. In this case, the amine radical R has the following formula:

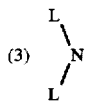

In said formula of the amine radical, L can be hydrogen or an alkyl radical such as:

(5)

wherein n is an integer equal to or greater than one.

Consequently, the complete formula of the 1-2-4 amino-triazole ligand is:

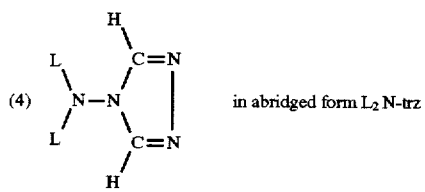

Although many amino-triazole ligands are possible, use is made, in particular, of the following one:

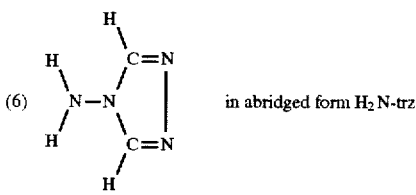

From the above, it results that the metal-ligand complex may have, for example, the following formula, in which M is an above-described metal ion:

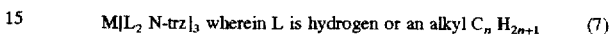

(7)

(8)

The metal-ligand complex may comprise a number of different ligands:

For example, a number of different aminotriazole ligands having the following formulas:

(9)

wherein L and L' are hydrogen or two different alkyls, and x is a concentration in the range between 0 and 3.

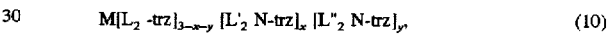

(10)

wherein L, L', L" are hydrogen or three different alkyls, and x and y are concentrations for which the following relationship applies: x +y<3.

The metal-ligand complex may comprise, apart from at least an aminotriazole ligand, one or more ligands such as: a substituted triazole of the formula:

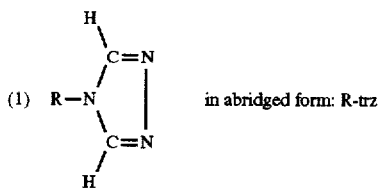

wherein R is an alkyl radical $C_n H_{2n+1}$.

Dependent upon the values of the integer n, different alkyl radicals are obtained which are hereinafter referred to as R, R', R" etc. Of the plurality of possible, substituted triazole ligands obtained with different values for the integer n in the alkyl-radical formula (5), use is made, in particular, of the following one:

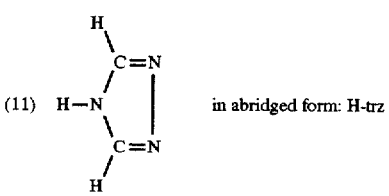

The metal-ligand complex may also comprise, apart from at least an obligatory aminotriazole ligand, one or more triazolate ligands, referred to as trz⁻ having the following formula:

(2) 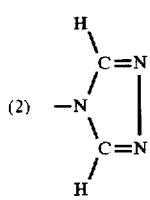 in abridged form: (trz⁻)

From the above, it results that the metal-ligand complex may also have the following formulas:

 (12)

wherein $0 < x < 3$

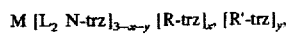 (13)

wherein $x + y < 3$

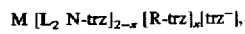 (14)

wherein $x < 2$

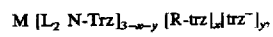 (14')

wherein $x + y < 3$

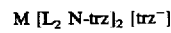 (15)

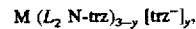 (15')

wherein $y < 3$

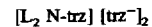 (16)

The 1-2-4 triazole ligands or 1-2-4 triazolates can of course be replaced, entirely or partly, by aminotriazole ligands based on the formulas (9) and (10).

Dependent upon the metal ion selected, the value of the integer n in the alkyl radicals R and amine radicals $L_2N$, and dependent upon the triazole ligands and triazolates bonded to the amino-triazole ligand, many combinations are possible to form the metal-ligand complex.

However, said combinations are limited by the fact that at least 1 aminotriazole ligand must be included in the metal-ligand complex, and that this complex must be formed with a metal ion having an electronic combination in d5, d6 or d7.

Id) The anions of the molecules

The molecules of the network comprise, in addition to the complex of a metal ion and of one of the above-described ligands, an anion of the sulforganic type.

Said anion of the sulforganic type preferably comprises a sulfito radical $SO_3^-$.

Of the sulforganic anions having a sulfito radical, use is made, in particular, of the sulfito-aryl anions, in which the sulfito radical $(SO_3^-)$ is bonded to a cyclic radical Φ of the benzene type $(C_6H_5^+)$ or to one of its derivatives; of the sulfito-aryls, the following examples are given:

sulfito-benzene $(SO_3^-)$-Φ of the formula:

substituted sulfito-aryls $(O_3S)^- - C_6H_4 - R$ of the formula:

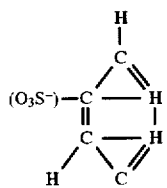 (17)

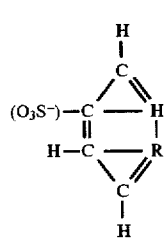 (18)

wherein R is the alkyl radical $C_nH_{2n+1}$ (formula 5) in abridged form $(O_3S^-)$-Φ-R The structural formula of which can be expressed as follows:

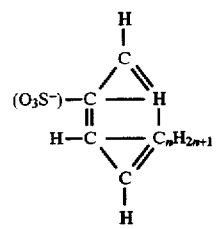 (19)

Of the substituted sulfito-aryls of formula (19), sulfito-methyl-benzene is mentioned, in which the methyl radical is in the para position. This anion is called tosylate (abbreviation: tos), and it is based on the tosyl radical $SO_2-C_6H_4-CH_4$. This anion has the following abridged formula:

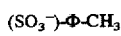

and the following structural formula:

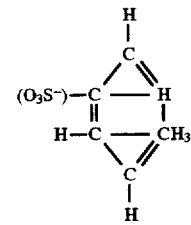 (20)

sulfito-aryls having at least a supplementary benzene radical Φ' of the formula:

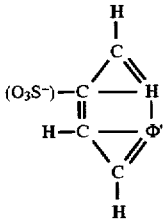 (21)

Sulfito-quinone or sulfito-polybenzene, which have said formula, are mentioned.

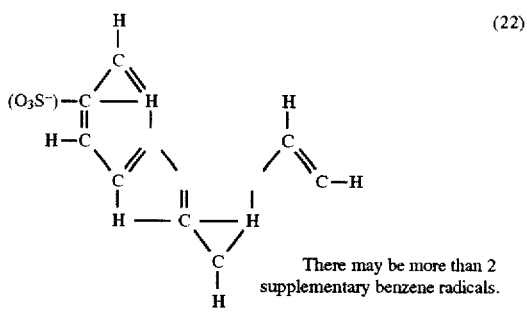
(22)

There may be more than 2 supplementary benzene radicals.

Of the sulfito-aryls having a supplementary benzene radical, also sulfito-naphthalene having the sulfito radical in the meta position is mentioned:

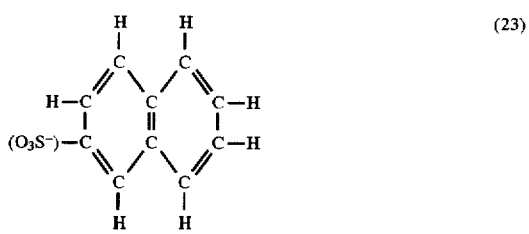
(23)

Of the sulforganic anions having a sulfito radical, use is also particularly made of:

the sulfito-alkyls $(SO_3^-)$-R, in which the sulfito radical $(SO_3^{31})$ is bonded to an alkyl radical R forming a saturated or unsaturated chain in accordance with formula (5). Of the sulfito-alkyls the following examples are mentioned:

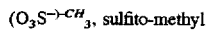, sulfito-methyl (24)

, sulfito-ethyl (25)

Of the sulforganic anions having a sulfito radical $(SO_3^-)$, use is also particularly made of organic sulfito- halides. Hereinbelow, a halogen ion is represented by X. The following examples are given:

alkyl sulfito-halides, such as:

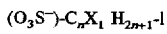 (26)

where X is an halide such as F, Cl, Br or I, and l is an integer in the range between 0 and 2n+1.

Of the alkyl sulfito-halides use is made, in particular, of fluorine-containing sulfito-alkyls such as:

 (27)

in abridged form: tofl.

aryl sulfito-halides such as:

fluorine-containing sulfito-aryls of the formula:

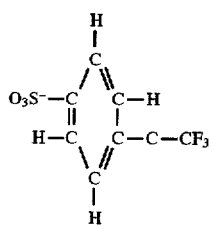
(28)

Ie) Formulation of the molecules

In the following, some simple formulations of starting compounds used in the sub-family selected in accordance with the invention will be shown.

molecule formed from the metal-ion complex $Fe^{2+}$ and from the aminotriazole ligand $(NH_2$-trz), with a tosylate anion (tos⁻)

$$Fe^{2+}(NH_2\text{-trz})_3(tos^-)_2 \qquad (29)$$

having the following structural formula:

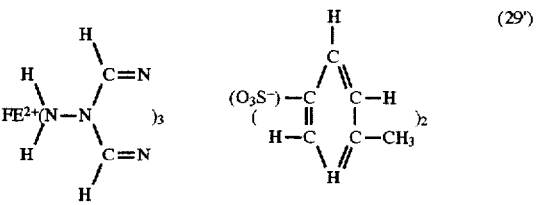
(29')

molecule formed from the metal-ion complex $Fe^{2+}$ and from the aminotriazole ligand $(H_2N$-trz), with a fluorine-containing sulfito-alkyl anion $$Fe^{2+}(NH_2\text{-trz})_3(tofl^-)_2 \qquad (30)$$

having the following structural formula:

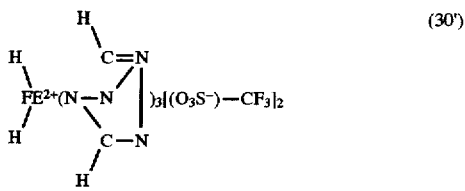
(30')

If) Structure of the network

In the foregoing, it has been stated that the entropy term $T\Delta S$ implies the participation of a term connected to the network.

Said network term results from the participation of a thermal disorder term, which is a function of the temperature T, and of a structure term or order term.

For example, the presence of bond bridges between metal nuclei in a compound implies the existence of a factor of a short-distance order.

To exhibit a good cooperativity between molecules, that is abrupt spin transitions in which all molecules simultaneously undergo a transition or none of the molecules undergoes said transition, the compound must exhibit bonds between the metallic ion-ligand complexes.

Thus, the greater the cooperativity in a complex, the greater the retardation effect and the hysteresis amplitude $\Delta T$ are. The cooperativity of the molecules is augmented by the presence of water molecules, in a ratio of at least 1 water molecule per molecule of the ion-metal complex. These water molecules in the network are bonded to the aminotriazole ligand only by means of a hydrogen type of bond. Said water molecules are not covalently bonded. They act on the intermolecular bonding strength. Consequently, dependent upon the selection of the metal-ligand complex and the anion, many formulations are possible for the spin-transition parent compound. By way of example, two formulations are given:

network corresponding to the molecule (29) shown above:

$$Fe^{2+}(NH_2\text{-trz})_3(tos^-)_2, mH_2O, \qquad (31)$$

where m is in integer which is equal to or greater than 1, for example m=6.

network corresponding to molecule (30)

$$Fe^{2+}(NH_2\text{-}trz)_3(tofl^-)_2, mH_2O. \quad (32)$$

The surprising effect obtained by means of the invention resides in that the choice of the anion of the molecule from the sulforganic anions enables the intermolecular bonding strength in the network to be controlled and increased. Said novel anions selected, bring about, in an unexpected manner, a factor of a short-distance order and a greater retardation effect; they enable a greater hysteresis amplitude $\Delta T$ to be obtained, corresponding to a bistability range of the high-spin and low-spin states with an amplitude which is sufficient for the intended industrial application.

II/ Method of manufacturing the parent compounds

For example, to prepare the compound having the above-described network (31):

$$Fe^{2+}(NH_2\text{-}trz)_3(tos^-)_2, H_2O, \quad (31)$$

the following constituents are mixed:

n moles of the precursor of the nucleus of the compound in accordance with the invention, i.e. n moles formed of the iron ion $Fe^{2+}$ bonded to the counterion ($tos^-$) in accordance with the formula:

$$n\ Fe^{2+}(tos^-)_2, 6H_2O, \quad (33)$$

which is used in a solution of pure methanol $CH_3\text{-}OH$, in a concentration of 10 n moles per liter;

and 3n moles of 1-2-4 aminotriazole ($NH_2\text{-}trz$) in a solution of pure methanol $CH_3\text{-}OH$, in a concentration of 30 n moles per liter.

This mixture is formed at ambient temperature, i.e. approximately 293 to 300 K. In this method of manufacture, n is a number greater than zero.

To obtain at least one water molecule in the network, hygroscopic molecules such as:

$$Mg(ClO_4)_2, \quad (34)$$

$$KClP_2, \quad (35)$$

$$NaClO_4 \quad (36)$$

are added to this mixture in a molar ratio of 25 to 100% in mas of molecules of precursor of the metal nucleus.

This mixture is subsequently concentrated in a vacuum, for example at a pressure of approximately 4. 103 Pa (30 mm mercury; it is noted that 760 mm of Hz=$10^5$ Pa) while simultaneously bringing this mixture to a temperature in the range between 333 K and 343 K, for example approximately 338 K.

A compound of the formula:

$$Fe^{2+}(NH_2\text{-}trz)_3(tos^-)_2, mH2O \quad (31)$$

precipitates rapidly.

As soon as the precipitate is obtained, the solvent is eliminated as quickly as possible by filtering to obtain a compound having a degree of purity of 99% in mass.

The compound AA/ of the formula (29) $Fe^{2+}(NH_2\text{-}trz)_3$ $(tos^-)_2$, $mH_2O$ then is in a powdery form, or is a powder, of a purple color.

If the solvent is not eliminated immediately, and if the $Fe^{2+}(NH_2\text{-}trz)_3(tos^-)_2$ molecule remains in contact with a small or very small (several ml) quantity of the methanol solvent, "deprotonation" of said molecule takes place, resulting in a variant of the invention, which comprises, in addition to the obligatory aminotriazole ligand, a second ligand, which is a triazolate ($trz^-$). In said variant, the compound has the following formula:

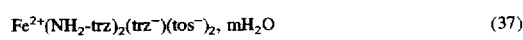

$$Fe^{2+}(NH_2\text{-}trz)_2(trz^-)(tos^-)_2, mH_2O \quad (37)$$

or a mixture of said compound:

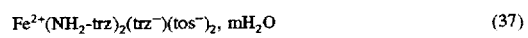

$$Fe^{2+}(NH_2\text{-}trz)_2(trz^-)(tos^-)_2, mH_2O \quad (37)$$

with

$$Fe^{2+}(NH_2\text{-}trz)_3(tos^-)_2, mH_2O. \quad (31)$$

In this mixture, the majority constituent is always the compound having two ligands. Thus, the properties of the compound having two ligands will excel the properties of the compound having only the aminotriazole ligand.

Meanwhile, as stated hereinabove, the desired properties:

a large bistability range $\Delta T$ average bistability temperature $\approx T_R$ are always obtained by virtue of the action of the tosylate ($tos^-$) anion.

If the iron ion $Fe^{2+}$ is used as the metal, it is advisable to preclude oxidation thereof. In the case of a thermally induced spin transition from the original low-spin state to the high-spin state, the color of the compound changes from the original purple color to a white color. This white compound, which is stable in the high-spin state, could turn yellow with time, particularly if it comprises an excess of iron $Fe^{2+}$. In this case, as a matter of fact, said iron $Fe^{2+}$ does not comprise ligands and oxidizes in the presence of water, resulting in $Fe^{3+}$. As explained hereinabove, the presence of the $Fe^{3+}$ ion must be precluded because the desired properties in the form of a change of color during spin transition are masked by said ion.

Thus, particularly in the case of iron, the white color should be stabilized. Said stabilization is obtained by adding a reducing agent, for example ascorbic acid in a quantity below 5% by mass, to the product which may be either a powder or a pulverulent product.

Other organic solvents of the alcoholic type can be used instead of methanol to prepare the compounds.

In general, the compounds in accordance with the invention are prepared by bringing together:

n moles of a precursor of the metal ion M, which precursor is used in an alcoholic solution as described hereinabove, comprising the selected sulforganic anion as the counter ion, and 3 n moles of ligands among the substituted triazoles, including at least n moles of the obligatory aminotriazole ligand in an alcoholic solution.

The method is then continued as described hereinabove with respect to the starting compound having formula (31).

IV—General properties of spin transition compounds of the sub-family selected in accordance with the invention.

With reference to FIG. 1, the compounds of the above-described sub-family exhibit thermally induced spin transitions.

These spin transitions are accompanied by electronic and structural modifications of the molecules. These modifications cause an abrupt change of the absorption spectrum of the molecules and hence of the color of the compounds due to the fact that the transitions between the electronic energy levels have become different.

Thus, in the low-spin state (LS) the compounds are dark purple, whereas in the high-spin state (HS) the compounds are chalk-white. In these states, the compounds exhibit a very great color contrast.

Consequently, the change of the spin state can be optically detected.

Both the high-spin state and the low-spin state are stable at a temperature close to the so-called critical temperature. The high-spin and low-spin states are stable at this critical temperature in a concomitant manner.

During the spin transitions, these materials exhibit a retardation effect caused by the intermolecular cooperativity. This brings about a hysteresis effect.

FIG. 1 shows that said compounds exhibit two potential wells, one of which corresponds to curve A, which is related to the low-spin state, and the other corresponds to the curve B, which is related to the high-spin state. These potential wells A and B are separated by a potential barrier. The bottom Ao of the potential well A (LS) corresponds to a first energy level $H_{LS}$ and to a first metal-ligand distance $D_{LS}$, and the bottom Bo of the potential well B (HS) corresponds to a second energy level $H_{HS}$ and to a second metal-ligand distance $D_{HS}$.

The difference in energy between the bottom levels Ao and Bo of said two potential wells is referred to as $\Delta H = H_{HS} - H_{LS}$.

An increase of the temperature of one of the selected compounds which, at the outset, is in the low-spin state (LS) in which the electrons are trapped in the first potential well A, induces excited high-spin states. However, these excited states are not stable and the electrons relax back, via allowed transitions, while following a main relaxation path which is that of the second potential well B, which corresponds to a perfectly stable high-spin state.

Consequently, the electrons remain trapped in the second potential well B and do not spontaneously return to the first potential well A, which corresponds to the low-spin state. To return to the low-spin state, the compounds must be cooled.

In FIG. 2, the curve represents a hysteresis cycle of the compound having the chemical formula (31) which is directly obtained by the above-described method. Hereinbelow, it will be used as an exemplary compound.

The molar fraction MF of the material which has undergone a transition at a temperature T (in degrees Kelvin) is plotted on the Y-axis and the temperature T is plotted on the X-axis.

The curve of FIG. 2 shows that this compound has a hysteresis cycle in the range between:

$T_{HS}=330$ K for the high-spin transition temperature, $T_{LS}=260$ K for the low-spin transition temperature.

At temperatures below the temperature $T_{LS}$, the compound is in the low-spin state (LS), and at temperature above the temperature $T_{HS}$, the compound is in the high-spin state (HS).

At a temperature Tc≈295 K, being the mean critical temperature, the high-spin and low-spin states previously induced by a suitable thermal variation remain stable for an indefinite period of time.

These properties would never have been obtained by means of the teachings of Patent Application EP 0 543 465 as in said Application the anions are selected in a different manner.

Consequently, if use is made of a starting compound at ambient temperature $T_R \approx 296$ K, being the ambient temperature close to the ideal critical temperature, the compound is in the low-spin state and of a purple color, since $T_R < T_{HS}$.

If the compound is heated to a temperature T, such that $T_{HS} < T$, that is 330 K $< T$, it becomes white because it is in the high-spin state.

Subsequently, if the compound is cooled to ambient temperature $T_R = 296°$, it remains white because it is in the bistability range in which the high-spin and low-spin states are stable for an indefinite period of time and in a concomitant manner, since $T_{LS} < T_R$.

If the compound is cooled to a temperature below the low-spin transition temperature $T_{LS}$, i.e. T<260 K, the compound turns purple again because it returns to the low-spin state.

Subsequently, once the compound has been cooled to a temperature below $T_{LS}$, the compound remains purple when it is brought to the ambient temperature $T_R = 296$ K, it remains in the low-spin state, because $T_{LS} < T_R < T_{HS}$.

These operations can be indefinitely repeated at will, by exposing the compound to thermal action. The spin transition is optically detected.

All of the selected compounds having the above-mentioned general or particular formulas have the same properties and the same surprising effects as the above-described compound having formula (31).

V—Device for writing, storing, and displaying data.

A device for writing, storing and displaying data, which comprises at least one of the selected compounds in accordance with the invention, is described by way of example. This device comprises:

A) an active medium and a support: a screen

To provide a device for writing, storing and displaying data, it is first of all necessary to prepare an active medium which comprises one or more spin-transition chemical compounds, as selected and described hereinabove, and which medium is bonded to a support.

In a first example, the active medium can favorably be formed from a thin film of the chemical compound which is directly deposited on the support. For this purpose, the film can be manufactured by evaporating a solvent comprising the powder of the chemical compound selected.

In a second example, the chemical compound in powdered form can be embedded in a transparent material. This material may be a transparent polymerizable resin which is deposited on the support.

The support may be a plate of any contour form or dimensions, such as square, rectangular, polygonal, circular, oval, etc. In particular, plates of very large dimensions and very small dimensions are feasible. The support may be rigid or flexible. In addition, a large number of, preferably, non-brittle, low-cost materials, for example a synthetic material, can very suitably be used as the support for the spin-transition compounds.

The device may be operated in the reflection mode or in the transmission mode. If the device is operated in the transmission mode, the support may consist of a transparent material.

In the device for writing, storing and displaying, the active medium comprises display regions and background regions.

For the sake of simplicity, the active medium bonded to the support will hereinafter be referred to as "screen".

B) A thermal addressing system.

The device must also comprise means for locally changing the temperature of the active medium or for changing the temperature of the entire active medium.

Said means consist of a thermal addressing system which serves to change the temperature of the display regions and, if necessary, of the background regions.

This thermal addressing system comprises, on the one hand:

B1) heating means such as:

a heating pencil, which can be made, for example, by means of a laser beam in the infrared range of the spectrum or a laser beam having a wavelength of 520 nm, a heating pencil can also be of the resistive-heating type, a matrix of resistive-heating contacts, which are addressed in accordance with x,y-patterned rows and columns (in this case X and Y denote coordinates for marking the contacts in the bidimensional matrix).

Said matrix of heating contacts may comprise two intersecting networks of electrodes. In a particular embodiment, the active medium may be disposed between said two electrode networks, with a heat-dissipating system being provided. In a favorable embodiment, the electrodes may be transparent and made, for example, of InSnO (indium tin oxide). In this particular embodiment, the system for writing, storing and displaying can operate equally well in the transmission mode as in the reflection mode.

If the intended use does not require the electrodes to be transparent, they can be made of all metals which are conventionally used for this purpose.

The advantage of the device which includes a matrix of x, y electrodes is that it can receive and display messages, data or informations which are coded in x, y.

In accordance with the invention, the system made in this manner can for example be used to realize an emission-reception device which is capable of displaying the transmitted message.

B2) This thermal addressing system comprises, on the other hand, cooling means such as:

means for cooling the support as a whole.

means for locally cooling the support, such as Peltier elements which are used to selectively cool the display regions or the background regions.

VI—Method of employing these devices

FIG. 3 represents a device for writing, erasing and displaying information, which is produced by means of the compound of formula (31), described hereinabove, to form an active medium.

This device enables a screen consisting of a support covered with the active medium including the compound AA) to be locally heated or cooled to various temperatures $T_{LS}$, $T_R$, $T_{HS}$, in at least one display region 3 and one background region 2. In the example illustrated in FIG. 3, the screen 1 comprises a single display region 3: in this example, the display region corresponds to a geometric pattern, in this case a letter of the alphabet "z".

Said heating and cooling means enable the following thermal perturbations to be successively, locally applied to the active medium of this screen, in the display region, at the location of the pattern:

A) the starting temperature is the ambient temperature $T_R$=296 K: the screen is uniformly purple (FIG. 3A); the entire screen 1, i.e. the display region 3 and the background region 2, is in the low-spin state.

B) the display region of the pattern is brought to a temperature T:

$T_{HS} < T$ i.e. 330 K≦T: the Z-shaped pattern 3 is white on a purple background (FIG. 3B); the area of the pattern remains in the high-spin state; the background remains purple because it remains in the low-spin state.

Figure 3A:
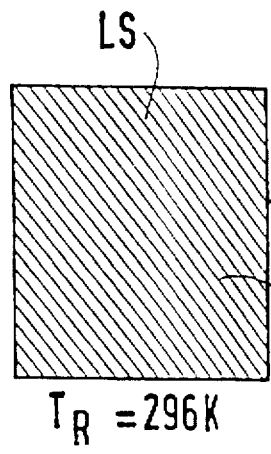
FIG. 3 shows the different stages of writing and erasing, using the exemplary compound a).
Figure 3B:
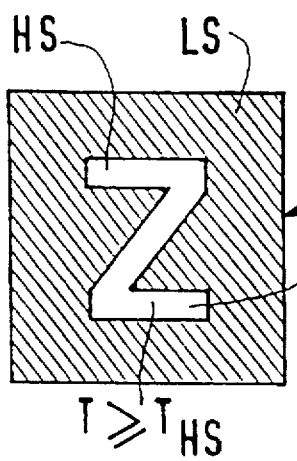
Figure 3C:
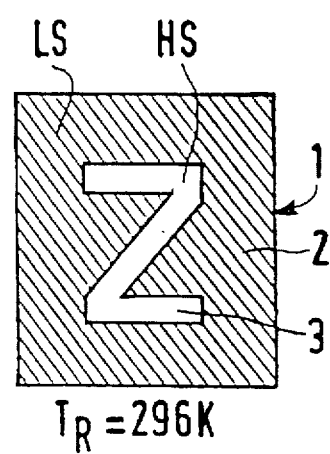

C) the temperature of the area of the pattern 3 is brought to the ambient temperature $T_R$=290 K: the area of the pattern remains white because it is still in the high-spin state; the background of the screen remains purple in the low-spin state (FIG. 3C). This situation can be maintained indefinitely. As a matter of fact, the low-spin state of the background, and the high-spin state of the pattern are stable, in a concomitant manner, for an indefinite period of time. An indefinite period of time is to be understood to mean herein a period of several years, if necessary. By virtue of the fact that the bistability range is large, that is between 260 K and 330 K, a change of the spin state cannot occur accidentally during normal operation of a display device.

Figure 3D:
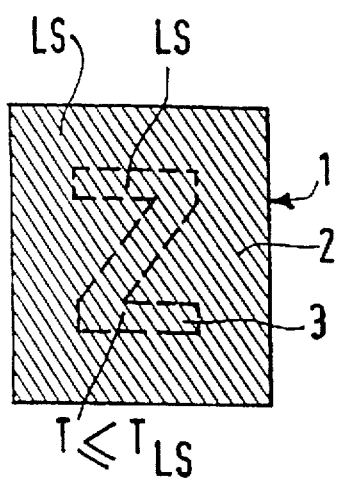
Figure 3E:
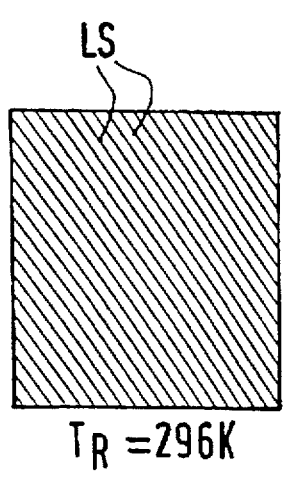

D) the temperature of the area of the pattern is reduced to a temperature T≦$T_{LS}$, i.e. T≦260 K: the area of the pattern turns purple again (FIG. 3D). The background is still in the purple, low-spin state. The entire screen is uniformly purple now.

E) the area of the pattern is reheated to the ambient temperature $T_R$=296 K, and as a result thereof the area of the pattern remains purple because this area is now in the low-spin state. Consequently, the entire screen is purple now in a stable manner.

By virtue of the interesting properties of the compounds selected in accordance with the invention, the information is displayed and stored in steps B and C, and erased in step D. The erased screen is waiting for new information at ambient temperature in step E. Consequently, said step E is an initialization or re-initialization step.

Thus, the compound is free of information again and can be used for a new writing step.

Steps A, B, C, D and E enable the compound to be used for displaying information by determining the instant (step B) when the information is written and the instant (D) when the information is totally erased. The information can be stored in or originate from a supplementary device other than the active medium of the screen. It is possible to use only the display function of the active medium produced by means of the compound.

Using step C, the compound enables information to be displayed by thermal action, stored in the active medium of the screen and preserved, at ambient temperature, without energy consumption, before said information is erased by thermal action. Consequently, apart from the display function, the active medium of the screen has a storage function. Said storage function does not consume any energy because it takes place at ambient temperature. Only the display and erase operations require energy for a thermal action.

The above-described properties of the compound having the chemical formula (31) also apply to the other compounds described hereinabove.

VII—Applications and advantages of the devices for writing, storing and displaying A display device including an active medium in accordance with the invention can advantageously be used to manufacture a display screen for a smart card at very low cost. As described hereinabove, the active medium may be bonded to a synthetic support, thereby forming a system which is particular well suited to cooperate with another synthetic support, such as the support of the smart card. In addition, the active medium bonded to its own support can be extremely thin. Consequently, the use of this active medium/support system for the manufacture of a screen which can display the data stored in a smart card is very favorable.

Such a display system can also be used in many other devices in which the fragility of a screen of liquid crystals is unfavorable, particularly for displaying data concerning the functioning of electrodomestic appliances. The display device can also be used for calculators, audio and video equipment, games etc.; and in particular for monitor screens, screens for the purpose of public address, urban sign posting, airport information posting etc. Such a display device could be used instead of liquid crystal display devices in a large number of applications, but it is not limited thereto, as it can be manufactured on very large supports.

An application of the display system could be, for example, of the "magic tablet" type. This tablet is a device which employs a heating pencil in combination with an active medium comprising the selected compounds. Such a magic tablet could be used to visualize the data entered into an information storage device by means of a classic tactile tablet.

A very interesting application of the magic tablet is the incorporation of said tablet in a user—"machine" interface when said "machine" is a multi-media system or multi-media device. The expression multi-media device is to be understood to mean an assembly composed of mobile or fixed sub-assemblies of information-supply systems, information-source carriers, information-transmission systems, information-reception systems, in the form of audio or video, or information storage, which information is made available by a user, from one sub-assembly to another, under the control of an interface system.

An advantage of screens comprising an active medium in accordance with the invention is that they may have very small or very large dimensions. The size of the screen depends only on that of the support.

An advantage of screens comprising an active medium in accordance with the invention is that they are very robust; in particular, they are much less fragile than the current liquid-crystal screens. The mechanical strength of screens in accordance with the invention is only connected with that of the support of the active medium.

An advantage of said screens comprising an active medium in accordance with the invention is that they can resist, without being damaged, temperatures which are much lower than their low-spin temperature or much higher than there high-spin temperature. To put the device into operation again after the screen has been subjected to a temperature which was unforeseen, re-initialization of the thermal addressing system suffices to display the background in the desired color, for example purple, at ambient temperature. To this end, it is useful to provide the entire surface of the active medium with means for cooling and heating.

Moreover, if said means are provided, the user can choose between a purple and a white background.

We claim:

1. A spin-transition parent compound in powdered form, comprising a network having molecules which are each formed from a complex in which a metallic ion M having an electronic configuration in d5 or in d6 or in d7, is bonded to at least one aminotriazole ligand of the formula:

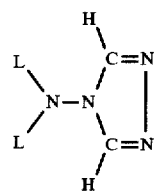

wherein L is hydrogen or an alkyl radical $(C_nH_{2n+1})$ and n is an integer which is equal to or greater than one, each molecule also including a sulforganic anion comprising a sulfito radical $(SO_3^-)$, and the network also including at least one water molecule $(H_2O)$ per molecule of the metallic complex M, said water molecule(s) in the network only being bonded to the aminotriazole ligand by a hydrogen bond.

2. A compound as claimed in claim 1, comprising a number of ligands bonded to the metal ion M, in accordance with one of the following formulations:

$$M[L_2N\text{-trz}]_{3-x}[L'_2N\text{-trz}]_x,$$

where L and L' are hydrogen or two different alkyls, and x is a concentration ranging between 0 and 3;

$$M[L_2N\text{-trz}]_{3-x-y}[L'_2N\text{-trz}]_x[L''_2N\text{-trz}]_y,$$

where L, L', L" are hydrogen or three different alkyls and x and y are concentrations for which the following applies: x+y<3;

$$M[L_2N\text{-trz}]_{3-x}[R\text{-trz}]_x,$$

where 0<x<3 and R is an alkyl radical $(C_nH_{2n+1})$;

$$M[L_2N\text{-trz}]_{3-x-y}[R\text{-trz}]_x[R'\text{-trz}]_y,$$

where x+y<3 and R' is a second alkyl radical;

$$M[L_2N\text{-trz}]_{2-x}[R\text{-trz}]_x[\text{trz}^-],$$

where x<2 and [trz$^-$] is a triazolate radical;

$$M[N_2\text{-trz}]_{3-x-y}[R\text{-trz}]_x[\text{trz}^-]_y,$$

where x+y<3;

$$M[L_2N\text{-trz}]_2[\text{trz}^-];$$

$$M(L_2N\text{-trz})_{3-y}[\text{trz}^-]_y,$$

where y<3;

$$M[L_2N\text{-trz}][\text{trz}^-]_2.$$

3. A chemical compound as claimed in claim 1, in which the anion is a sulfito-aryl, the sulfito radical being bonded to a benzene radical or the derivatives thereof.

4. A chemical compound as claimed in claim 1, in which the anion is a sulfito-alkyl, the sulfito radical being bonded to a saturated or unsaturated organic chain.

5. A chemical compound as claimed in claim 1, in which the anion is an alkyl sulfito-halide.

6. A chemical compound as claimed in claim 1, in which the anion is an aryl sulfito-halide.

7. A compound as claimed in claim 1, comprising a hygroscopic salt in a quantity of 25 to 100% by weight of said compound, to ensure that said water molecule is present in the network.

8. A compound as claimed in claim 7, in which the hygroscopic salt is iron borofluoride |Fe(BF$_4$)$_2$|, magnesium perchlorate |Mg(ClO$_4$)$_2$|, potassium perchlorate KClO$_4$|, sodium perchlorate |NaClO$_4$|, or a mixture of said salts.

9. A compound as claimed in claim 1, comprising a reducing agent in a quantity below 5% by weight of said compound.

10. A compound as claimed in claim 7, comprising a reducing agent in a quantity below 5% by weight of said compound.

11. A compound as claimed in claim 8, in which the reducing agent is ascorbic acid.

12. A method of manufacturing a parent compound as claimed in claim 1, said method comprising:

preparing a mixture at ambient temperature:

comprising n moles of a precursor $(M^{2+})$-A$_2$, NH$_2$O or $M^{3+}$)-A$_3$, mH$_2$O of the nucleus, wherein A is a sulforganic anion comprising a sulfito radical (SO$_3^-$), and depending on the metal ion, the formula of the precursor being:

a) $M^{2+}$ (A)$_2$, mH$_2$O
b) $M^{3+}$ (A)$_3$, mH$_2$O and the precursor being in solution in an organic, alcohol-like solvent in a concentration of, approximately , 10 n moles per liter, with 3 n moles of a substituted 1-2-4 triazole ligand, including at least n moles of an 1-2-4 aminoazole ligand, in solution in the same organic, alcohol-like solvent in a concentration of 30 n moles per liter;

concentrating said mixture, in a vacuum, at a temperature ranging between 330 and 350 K until precipitation of the desired compound is attained, and separating this compound from the organic, alcohol-like solvent to obtain a powder of this compound, wherein both n and m are integers greater than zero.

13. A method as claimed in claim 12, in which the organic, alcohol-like solvent is methanol (CH$_3$-OH).

14. A device for processing information, comprising an active medium which can be written, erased and re-written and which is bonded to a support, said active medium including a parent compound in powdered form or a mixture of parent compounds in powdered form as claimed in claim 1, said active medium comprising at least a display region and a background region.

15. A device as claimed in claim 14, in which the parent compound, or the mixture of parent compounds, is applied to a support in the form of one or more layers.

16. A device as claimed in claim 14, in which the parent compound or the mixture of parent compounds is embedded in an enveloping material.

17. A device as claimed in claim 14, which also comprises means, referred to as thermal addressing means, for at least locally modifying, on command, the temperature of said display regions or of the background regions or of both.

18. A device as claimed in claim 17, in which the thermal addressing system comprises a coded addressing device.

19. A device as claimed in claim 17, in which the thermal addressing system comprises first means for heating and second means for cooling which can be used at will to selectively generate in the addressing and background regions:

a temperature which is higher than or equal to a first temperature ($T_{HS}$) which is the temperature at which the transition from the low-spin state to the high-spin state takes place;

a temperature which is lower than or equal to a second temperature ($T_{LS}$), which is the temperature at which the transition from the high-spin state to the low-spin state takes place, or a third temperature ($T_R$), referred to as critical temperature, between the low-spin temperature ($T_{LS}$) of the hysteresis phenomenon associated with the effect of spin transitions, and the high-spin temperature ($T_{HS}$) of the hysteresis phenomenon, at which critical temperature, the compounds in the high-spin state can coexist with compounds in the low-spin state.

20. A device as claimed in claim 19, in which:

the first spin-transition temperature ($T_{HS}$) is of the order of 330 K;

the second spin-transition temperature ($T_{LS}$) is of the order of 260 K;

the third, critical temperature (Tc) of the hysteresis cycle is close to the ambient temperature ($T_R$) of approximately 295 K.

21. A device as claimed in claim 17, in which the parent compound or the mixture of parent compounds form a screen for visualizing data which are displayed under the control of the thermal addressing system.

22. A device of the smart-card type which comprises a device as claimed in claim 21.

23. A device of the multi-media type, which comprises a device as claimed in claim 21.

24. A device of the magic-tablet type, which comprises a device as claimed in claim 21.

25. A device of the interface type between a user and a machine, which comprises a device as claimed in claim 21.

26. A method of writing, displaying, storing or erasing data in the active medium of a device as claimed in of claim 21, comprising the action performed by the thermal addressing system for carrying out the following operations:

A) initialization by bringing the active medium of the background and display regions of the device to a temperature which is suitable for inducing the low-spin state of the compound, the active medium being of a purple color in this step, B) writing by subjecting selected display regions to a temperature which is higher than or equal to said first high-spin temperature ($T_{HS}$) of the compound, during which writing step the display regions change to the white high-spin state of the compound, and the background is maintained at a temperature below said first temperature $T_{HS}$, for example equal to the third, ambient temperature ($T_R$), with the active material of the background remaining purple, C) displaying by maintaining the selected display regions at a temperature which is higher than said second, low-spin temperature ($T_{LS}$), for example equal to the third, ambient temperature ($T_R$), during which display step the display regions remain white while being in the high-spin state, and the background is maintained in the purple, low-spin state, D) erasing by subjecting the display regions to a temperature which is lower than the second low-spin temperature ($T_{LS}$), during which erasing step the display regions return to the purple low-spin state, and the background is maintained, for example, at the third ambient temperature ($T_R$), with the active material of the background remaining purple.

27. A method of writing, displaying, storing or erasing data in the active medium of a device as claimed in any one of claim 21, comprising the action performed by the thermal addressing system for carrying out the following operations:

A) initialization by bringing the active medium of the background and display regions to a temperature which is higher than or equal to said first, high-spin temperature ($T_{HS}$) of the compound, the active medium then turns white and is, subsequently, brought to the third temperature ($T_R$), referred to as the ambient temperature at which the compound is stable in the white high-spin state, B) writing by subjecting the selected display regions to a temperature which is lower than or equal to said second, low-spin temperature ($T_{LS}$) of the compound, during which writing step the display regions change to the purple low-spin state of the compound, and the background is maintained at the third temperature ($T_R$) which lies in the bistability range of the compound, to preserve the white color of the high-spin state, C) displaying by bringing the temperature of the selected display regions to the third temperature ($T_R$) which lies in the bistability range of the compound, to preserve the purple color of the low-spin state in the display regions, while the background regions remain in the white, high-spin state, D) erasing by subjecting the display regions to a temperature which is higher than the first high-spin temperature ($T_{HS}$) of the compound, during which erasing step the display regions return to the white color of the high-spin state, and then return to the third ambient temperature ($T_R$) at which the background and the display regions remain white as they are in the bistability range of the compound.

* * * * *